United States Patent [19]

Mabire et al.

[11] Patent Number: 5,536,481
[45] Date of Patent: Jul. 16, 1996

[54] USE OF CYCLIC AMINALS OF GLYOXYLIC ACID FOR TRAPPING HYDROGEN SULPHIDE

[75] Inventors: Frédéric Mabire, Arcueil; Didier Wilhelm, Issy Les Moulineaux, both of France

[73] Assignee: Societe Francaise Hoechst, Puteaux, France

[21] Appl. No.: 354,733

[22] Filed: Dec. 14, 1994

[30] Foreign Application Priority Data

Dec. 29, 1993 [FR] France .................... 93 15801

[51] Int. Cl.⁶ .................................. B01D 53/52
[52] U.S. Cl. .................... 423/220; 423/226; 423/228; 423/242.1
[58] Field of Search .................... 423/228, 226, 423/220, 576.7, 242.2; 502/517

[56] References Cited

U.S. PATENT DOCUMENTS

| | | | |
|---|---|---|---|
| 1,951,992 | 3/1934 | Perkins | 423/228 |
| 3,755,167 | 8/1973 | Otto et al. | 252/33.2 |
| 4,094,957 | 6/1978 | Sartori et al. | 423/223 |
| 4,405,578 | 9/1983 | Sartori et al. | 423/223 |
| 4,624,838 | 11/1986 | Pan et al. | 423/226 |
| 4,662,905 | 5/1987 | Matsuura et al. | 55/158 |
| 4,902,408 | 2/1990 | Reichert et al. | 208/239 |
| 5,413,627 | 5/1995 | Landeck et al. | 95/235 |

FOREIGN PATENT DOCUMENTS

| | | |
|---|---|---|
| 2545378 | 11/1984 | France . |
| 9110634 | 7/1991 | WIPO . |
| 9204102 | 3/1992 | WIPO . |

OTHER PUBLICATIONS

"Reaction of Ethylenediamine and C,C,C',C'-Tetramethyl Ethylenediamine with Glyoxylate in the Presence and Abscence of Zinc (II) or Nickel (II)" by Hilton et al; J. Am. Ch. Soc., 93:25; 15 Dec. 1971 pp. 6831–6836.

"Reactions of Perhydro–2,2'–Bipyrimidones with Carbonyl Compounds Bearing α–Carbonyl Functionality" by Craig et al; J. Org. Chem.; vol. 58; No. 21; (1993, pp. 5753–5758.

Primary Examiner—Gary P. Straub
Assistant Examiner—Timothy C. Vanoy
Attorney, Agent, or Firm—Browdy and Neimark

[57] ABSTRACT

Use of a product of formula (I):

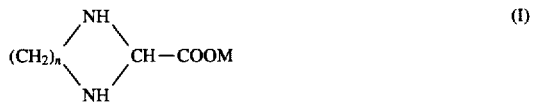

in which M represents a hydrogen, lithium, sodium or potassium atom, or an $NH_4$ group and n represents 2 or 3, as an agent for trapping hydrogen sulphide, its use for the preparation of a composition for trapping hydrogen sulphide and process for the elimination of hydrogen sulphide from a fluid.

9 Claims, No Drawings

USE OF CYCLIC AMINALS OF GLYOXYLIC ACID FOR TRAPPING HYDROGEN SULPHIDE

FIELD OF THE INVENTION

The present invention relates to the use of cyclic aminals of glyoxylic acid for trapping hydrogen sulphide.

BACKGROUND OF THE INVENTION

Hydrogen sulphide is a gas which is toxic, inflammable, explosive and corrosive, in particular vis-à-vis ferrous metals. Natural gases are very often contaminated by hydrogen sulphide which must be eliminated as quickly and as completely as possible before they are sent to sites for conversion or consumption. In order to do this, it was proposed to treat these gases contaminated with hydrogen sulphide either with aldehydes such as formaldehyde, acrolein, isobutyraldehyde, glyoxal, in aqueous solution or in emulsion, optionally in the presence of emulsifiers or amines such as butylamine, monoethanolamine, 4-aminoethyl 1,8-diamino octane, N,N'-dimethylethylenediamine (U.S. Pat. Nos. 1,991,765, 3,459,852, 4,501,668, 4,532,117, 4,680,127, 4,767,860, 4,978,512, 5,085,842, 5,152,916, 5,225,103, 5,223,175, European Patent Application Nos 383,499, 405, 719, 411,745, 475,641, 475,642 and 540,666), or with metal oxides such as iron or zinc oxides, or with oxidizing agents such as sodium nitrite, hydrogen peroxide, sodium chlorite, chlorine dioxide (U.S. Pat. No. 4,515,759, Canadian Patent No. 1,207,269, European Patent Application Nos 082,513, 261,974 and 389,150). Although these products have useful properties for trapping hydrogen sulphide, more economical, more effective products are sought today which act more rapidly and do not produce any insoluble product.

WO-A-91 10634 describes the use of aromatic heterocyclic metal-ligand complexes to catalyze the action of the oxygen added to a medium to be treated containing hydrogen sulphide or thiols; so that the oxygen can act, it is necessary to carry out the process in an organic medium, in the presence of a cosolvent.

SUMMARY OF THE INVENTION

Now, the Applicant has discovered with astonishment that certain cyclic aminals of glyoxylic acid have excellent properties for trapping hydrogen sulphide present in a fluid.

This is why a subject of the present invention is the use of cyclic aminals of glyoxylic acid of formula (I):

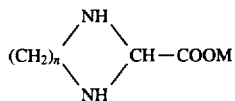

(I)

in which M represents a hydrogen, lithium, sodium or potassium atom, or an $NH_4$ group and n represents 2 or 3, as agents for trapping hydrogen sulphide.

It is known that the condensation of glyoxylic acid with a diamine of formula (II):

(II)

in which n has the meaning given previously, leads to the corresponding product of formula (I) in which M represents a hydrogen atom which can then be salified according to the usual methods (A. HILTON et al., J. Amer. Chem. Soc., 1971, 93, 6831–6836 and D. C. CRAIG et al., J. Org. Chem., 1993, 58, 5753–5758.

The products of formula (I) have useful properties vis-à-vis hydrogen sulphide. These properties justify their use for trapping hydrogen sulphide and a subject of the invention is the use, as agents for trapping hydrogen sulphide, of the products as defined by formula (I) above.

A more particular subject of the invention is the use, as agents for trapping hydrogen sulphide, of the products of formula (I) above characterized in that in formula (I), M represents a hydrogen atom or a sodium atom.

Among these last-named products, a quite particular subject of the invention is, as agents for trapping hydrogen sulphide:

sodium 2-imidazolidinecarboxylate, sodium 2-perhydropyrimidinecarboxylate.

According to the invention, the products of formula (I) are used in aqueous solution, at a pH of greater than 7. Under the preferred conditions for implementing the invention, the products of formula (I) are used in aqueous solution, at a pH of greater than 7 and at a concentration by weight comprised between 10 and 50% and more particularly at a concentration by weight of 25±10%.

The products of formula (I) make it possible to reduce and even to eliminate the hydrogen sulphide present in a fluid rapidly and without producing insoluble sulphurous products. In this use, the products of formula (I) can be employed at a dose which can vary from 0.1 to 2 moles per mole of hydrogen sulphide. According to a preferred embodiment of this use, 0.5±0.2 mole of the product of formula (I) can be employed per mole of hydrogen sulphide to be eliminated, but these quantities can vary as a function of the level of elimination desired.

Also a subject of the present invention is the use of a product of formula (I) as defined above for the preparation of a composition for trapping hydrogen sulphide.

Finally a subject of the present invention is a process for the elimination of hydrogen sulphide from a fluid characterized in that a fluid loaded with hydrogen sulphide is put in contact with at least one product of formula (I) as defined above. The products of formula (I) are preferably used at the doses indicated above.

According to the invention, if the fluid to be treated is gaseous, it is, for example, bubbled through an aqueous solution containing the necessary quantity of one or more products of formula (I) so as to obtain the desired level of elimination of the hydrogen sulphide contained in this gaseous fluid. In the case where the fluid to be treated is a liquid, it is preferably treated, advantageously under agitation, with an aqueous solution containing the necessary quantity of one or more of the products of formula (I) in order to obtain the desired level of elimination of hydrogen sulphide.

DETAILED DESCRIPTION OF THE INVENTION

The following examples illustrate the invention without however limiting it.

EXAMPLE 1

1,332 g of an aqueous solution of glyoxylic acid at 50% by weight is mixed under agitation, at ambient temperature, with 720 g of an aqueous solution of sodium hydroxide at 50% by weight. Then, 541 g (9 moles) of ethylenediamine is slowly introduced into this solution, agitated, and maintained at 25° C. by external cooling, and then the reaction solution is left for one hour at ambient temperature.

In this way 2,593 g of an aqueous solution is obtained containing 1,243 g (9 moles) of sodium 2-imidazolidinecarboxylate having a pH of about 11±0.5.

A sample of this aqueous solution was concentrated to dryness under reduced pressure then the solid product obtained, dried to a constant weight under reduced pressure, at ambient temperature, subjected to proton and $^{13}$C NMR analysis, produced spectra in accordance with the expected structure.

with a constant flow rate of 2.4 moles/hour, and the number of molecules of hydrogen sulphide trapped by these solutions is determined as a function of time, expressed in minutes. In order to do this, the hydrogen sulphide not trapped by the tested solution is recovered in 3.75 N soda, then, on regularly taken samples, the quantity of hydrogen sulphide trapped by this soda solution is determined by potentiometric analysis using a 0.1N aqueous solution of silver nitrate, with a silver measurement electrode and an Ag/AgCl reference electrode. By noting the difference, the quantity of hydrogen sulphide trapped by solutions A, B and C is then calculated. The results found are set out in table I. It is noted that the products of formula (I) absorb the hydrogen sulphide much more rapidly than the glyoxal, and furthermore they are much more effective.

TABLE I

| TIME (min) | Number of moles of H₂S introduced | Number of moles of H₂S trapped | | | Yield (%) | | | Effectiveness | | |
|---|---|---|---|---|---|---|---|---|---|---|
| | | A | B | C | A | B | C | A | B | C |
| 0 | 0 | 0 | 0 | 0 | 0 | 0 | 0 | | | |
| 10 | 0.4 | 0.4 | 0.398 | 0.29 | 100 | 99.5 | 72.5 | 0.95 | 0.85 | 0.2 |
| 15 | 0.6 | 0.59 | 0.59 | | 98.3 | 98.3 | | 1.40 | 1.25 | |
| 20 | 0.8 | 0.76 | 0.78 | 0.57 | 95.0 | 97.5 | 71.2 | 1.81 | 1.66 | 0.46 |
| 25 | 1.0 | 0.81 | 0.97 | 0.62 | 81.0 | 97.0 | 62.0 | 1.93 | 2.06 | 0.5 |
| 30 | 1.2 | 0.83 | 1.15 | 0.72 | 69.2 | 95.8 | 60.0 | 1.97 | 2.45 | 0.58 |
| 35 | 1.4 | 0.85 | | 0.78 | 60.7 | | 55.7 | 2.02 | | 0.63 |
| 40 | 1.6 | 0.87 | | 0.82 | 54.4 | | 51.2 | 2.07 | | 0.66 |

$$\text{Yield }(\%) = \frac{\text{Number of moles of H}_2\text{S trapped}}{\text{Number of moles of H}_2\text{S introduced}} \times 100$$

$$\text{Effectiveness} = \frac{\text{Number of moles of H}_2\text{S trapped}}{\text{Number of moles of trapping agents used}}$$

EXAMPLE 2

40 g (1 mole) of sodium hydroxide in solution in 40 g of water is introduced under agitation, maintaining the temperature at 20° C., into a solution of 130.15 g (1 mole) of 2-perhydropyrimidinecarboxylic acid, prepared according to D. C. Craig et al., J. Org. Chem., 1993, 58, 5757 and having a melting point of 109±1° C., in 130.15 g of water. In this way 340 g of an aqueous solution containing 152.14 g (1 mole) of sodium 2-perhydropyrimidinecarboxylate is obtained.

EXAMPLE 3

Starting with the aqueous solutions obtained in Examples 1 and 2, there are prepared by simple dilution with water a solution designated A, containing 200 g (1.45 moles) of sodium 2-imidazolidinecarboxylate per liter, and a solution designated B, containing 246.5 g (1.62 moles) of sodium 2-perhydropyrimidinecarboxylate per liter. In addition, for comparison, an aqueous solution designated C is prepared, containing 248.3 g (4.28 moles) of glyoxal per liter.

Hydrogen sulphide is bubbled through 290 ml of these three aqueous solutions A, B and C, at ambient temperature

We claim:

1. A method for trapping hydrogen sulfide out of a gas consisting essentially of contacting hydrogen sulfide with at least one compound according to the formula:

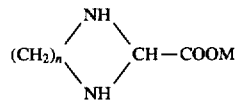
(I)

wherein M is hydrogen, lithium, sodium, potassium or NH₄, and n is 2 or 3.

2. The method according to claim 1 wherein M is hydrogen or sodium.

3. The method according to claim 2 wherein the compound is sodium 2-perhydropyrimidinecarboxylate.

4. The method according to claim 2 wherein the compound is sodium 2-imidazolidinecarboxylate.

5. A process for removing hydrogen sulfide from a gas containing hydrogen sulfide consisting essentially of contacting said gas containing hydrogen sulfide with at least one compound of the formula:

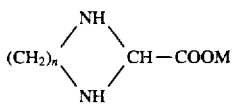

wherein M is hydrogen, lithium, sodium, potassium or NH$_4$, and n is 2 or 3.

6. The method according to claim 5 wherein the concentration of the at least one compound is from 0.1 to 2 moles per mole of hydrogen sulfide present in the gas containing hydrogen sulfide.

7. The method according to claim 5 wherein the compound is sodium 2-imidazolidinecarboxylate.

8. The method according to claim 5 wherein the compound is sodium 2-perhydropyrimidinecarboxylate.

9. The method according to claim 5 wherein the gas is bubbled through an aqueous solution of at least one compound of the formula:

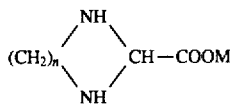

wherein M is hydrogen, lithium, sodium, potassium or NH$_4$, and n is 2 or 3.

* * * * *